(12) United States Patent
Kudoh et al.

(10) Patent No.: US 10,176,436 B2
(45) Date of Patent: Jan. 8, 2019

(54) EXTRACTING SKILL-LEVEL-BASED COMMAND EXECUTION PATTERNS FROM CATIA COMMAND LOG

(71) Applicant: INTERNATIONAL BUSINESS MACHINES CORPORATION, Armonk, NY (US)

(72) Inventors: Michiharu Kudoh, Kanagawa-ken (JP); Fumiko Satoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 14/970,266

(22) Filed: Dec. 15, 2015

(65) Prior Publication Data

US 2017/0168666 A1 Jun. 15, 2017

(51) Int. Cl.
| | | |
|---|---|---|
| G06F 3/048 | (2013.01) | |
| G06N 99/00 | (2010.01) | |
| G06F 3/0489 | (2013.01) | |
| G06F 3/0481 | (2013.01) | |
| G06F 9/451 | (2018.01) | |

(52) U.S. Cl.
CPC ......... *G06N 99/005* (2013.01); *G06F 3/0481* (2013.01); *G06F 3/04895* (2013.01); *G06F 9/453* (2018.02)

(58) Field of Classification Search
None
See application file for complete search history.

(56) References Cited

U.S. PATENT DOCUMENTS

| | | | |
|---|---|---|---|
| 8,092,288 B2 | 1/2012 | Theis | |
| 8,214,375 B2 | 7/2012 | Fitzmaurice et al. | |
| 2010/0191753 A1* | 7/2010 | Su | G06F 3/038 707/758 |

(Continued)

OTHER PUBLICATIONS

FreeCad, Workbenches and Mesh Workbench, 2011, https://www.freecadweb.org/wiki/index.php?title=Workbenches&direction=prev&oldid=5476 and https://www.freecadweb.org/wiki/index.php?title=Mesh_Workbench&oldid=4899 (Year: 2011).*

*Primary Examiner* — William C Trapanese
(74) *Attorney, Agent, or Firm* — Tutunjian & Bitetto, P.C.; Vazken Alexanian

(57) ABSTRACT

A method and system are provided for estimating a skill level of a user regarding a software program executed by the user on a computer processing system. The software program has workbenches that each include commands corresponding thereto. The method includes creating at least one special command set for user skill level estimation by including the commands that exist in various ones of the workbenches and that are executed at least a predetermined percentage of times by the user and excluding the commands which are common to at least two of the workbenches. The method further includes creating partial command sequences from the commands in the at least one special command set. The method also includes determining frequent command execution patterns by applying pattern mining to the partial command sequences. The method additionally includes estimating the skill level of the user based on frequencies of the frequent command execution patterns.

20 Claims, 2 Drawing Sheets

(56) References Cited

U.S. PATENT DOCUMENTS

2011/0154216 A1* 6/2011 Aritsuka ............... G06F 9/4443
　　　　　　　　　　　　　　　　　　　　　　　　　715/745
2014/0325490 A1　10/2014 Wiener et al.

* cited by examiner

EXTRACTING SKILL-LEVEL-BASED COMMAND EXECUTION PATTERNS FROM CATIA COMMAND LOG

BACKGROUND

Technical Field

The present invention relates generally to information processing and, in particular, to extracting skill-level-based command execution patterns from a computer-aided three-dimensional interactive application (CATIA) command log.

Description of the Related Art

A computer-aided three-dimensional interactive application (CATIA) has multiple workbenches such as a "Sketcher workbench" for a two-dimensional (2D) design sketch and a "Part Design workbench" for 3D modeling. A user can execute commands from toolbar menu of each workbench. However, since different users have different skill levels, there is a need to be able to extract and/or otherwise such skill level of a given user.

SUMMARY

According to an aspect of the present principles, a method is provided for estimating a skill level of a user regarding a software program executed by the user on a computer processing system. The software program has a plurality of workbenches that each include commands corresponding thereto. The method includes creating at least one special command set for user skill level estimation by including the commands that exist in various ones of the plurality of workbenches and that are executed at least a predetermined percentage of times by the user and excluding the commands which are common to at least two of the plurality of workbenches. The method further includes creating partial command sequences from the commands in the at least one special command set. The method also includes determining frequent command execution patterns by applying pattern mining to the partial command sequences. The method additionally includes estimating the skill level of the user based on frequencies of the frequent command execution patterns.

According to another aspect of the present principles, a computer program product is provided for estimating a skill level of a user regarding a software program executed by the user on a computer processing system. The software program has a plurality of workbenches that each include commands corresponding thereto. The computer program product includes a non-transitory computer readable storage medium having program instructions embodied therewith. The program instructions are executable by a computer to cause the computer to perform a method. The method includes creating at least one special command set for user skill level estimation by including the commands that exist in various ones of the plurality of workbenches and that are executed at least a predetermined percentage of times by the user and excluding the commands which are common to at least two of the plurality of workbenches. The method further includes creating partial command sequences from the commands in the at least one special command set. The method also includes determining frequent command execution patterns by applying pattern mining to the partial command sequences. The method additionally includes estimating the skill level of the user based on frequencies of the frequent command execution patterns.

According to yet another aspect of the present principles, a computer processing system is provided for estimating a skill level of a user regarding a software program executed by the user on the computer processing system. The software program has a plurality of workbenches that each include commands corresponding thereto. The system includes a hardware processor and a memory device, configured to create at least one special command set for user skill level estimation by including the commands that exist in various ones of the plurality of workbenches and that are executed at least a predetermined percentage of times by the user and excluding the commands which are common to at least two of the plurality of workbenches. The hardware processor and the memory device are further configured to create partial command sequences from the commands in the at least one special command set. The hardware processor and the memory device are also configured to determine frequent command execution patterns by applying pattern mining to the partial command sequences. The hardware processor and the memory device are additionally configured to estimate the skill level of the user based on frequencies of the frequent command execution patterns.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to extracting skill-level-based command execution patterns from a computer-aided three-dimensional interactive application (CATIA) command log. However, as will be readily evident to one of ordinary skill in the art given the teachings of the present principles provided herein, the present principles are applicable to other applications that involve workbenches or groupings of related commands executable by a user. These and other extensions of the present principles are readily determined by one of ordinary skill in the art given the teachings of the present principles provided herein, while maintaining the spirit of the present principles.

In CATIA, command execution logs include the time series list of executed commands and execution timestamps for those commands. In an embodiment, the present principles advantageously estimate a user's skill level from the frequency of command execution patterns which are regarded as feature vectors.

Figure 1:
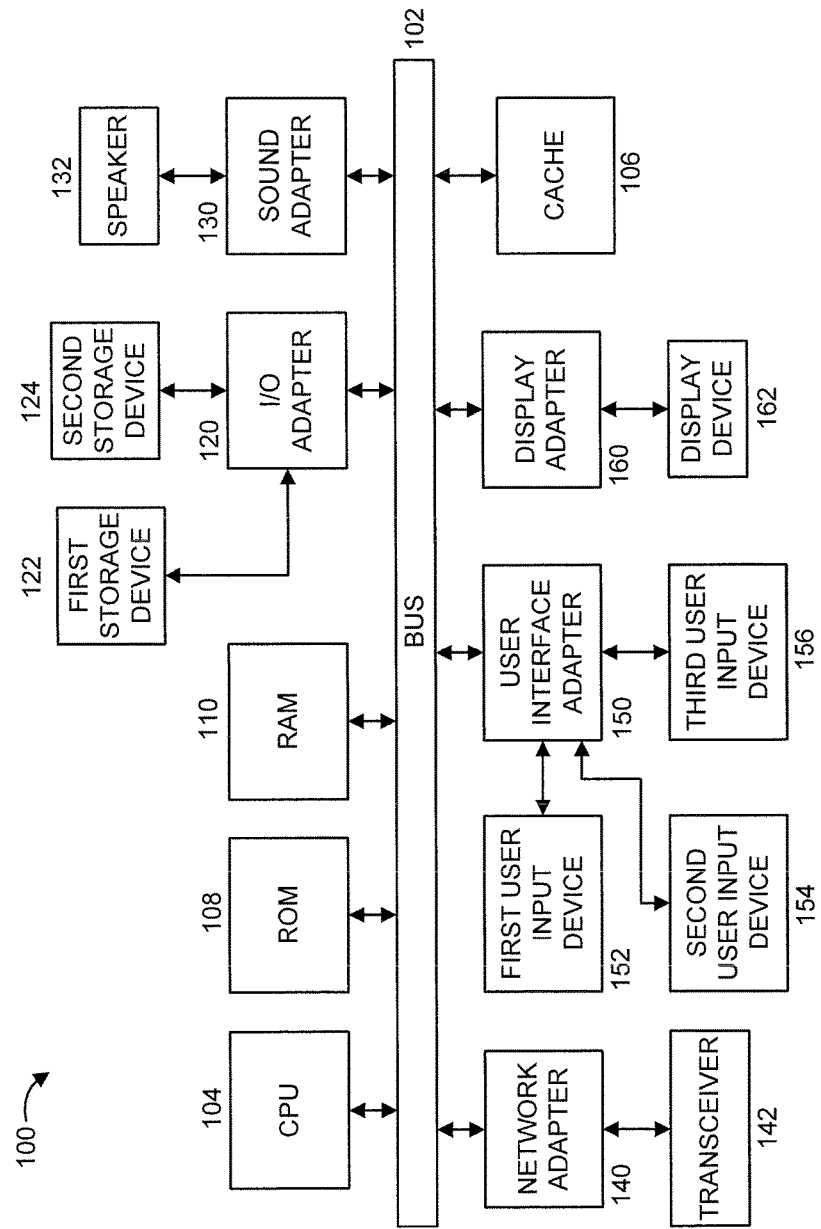
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O)

adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
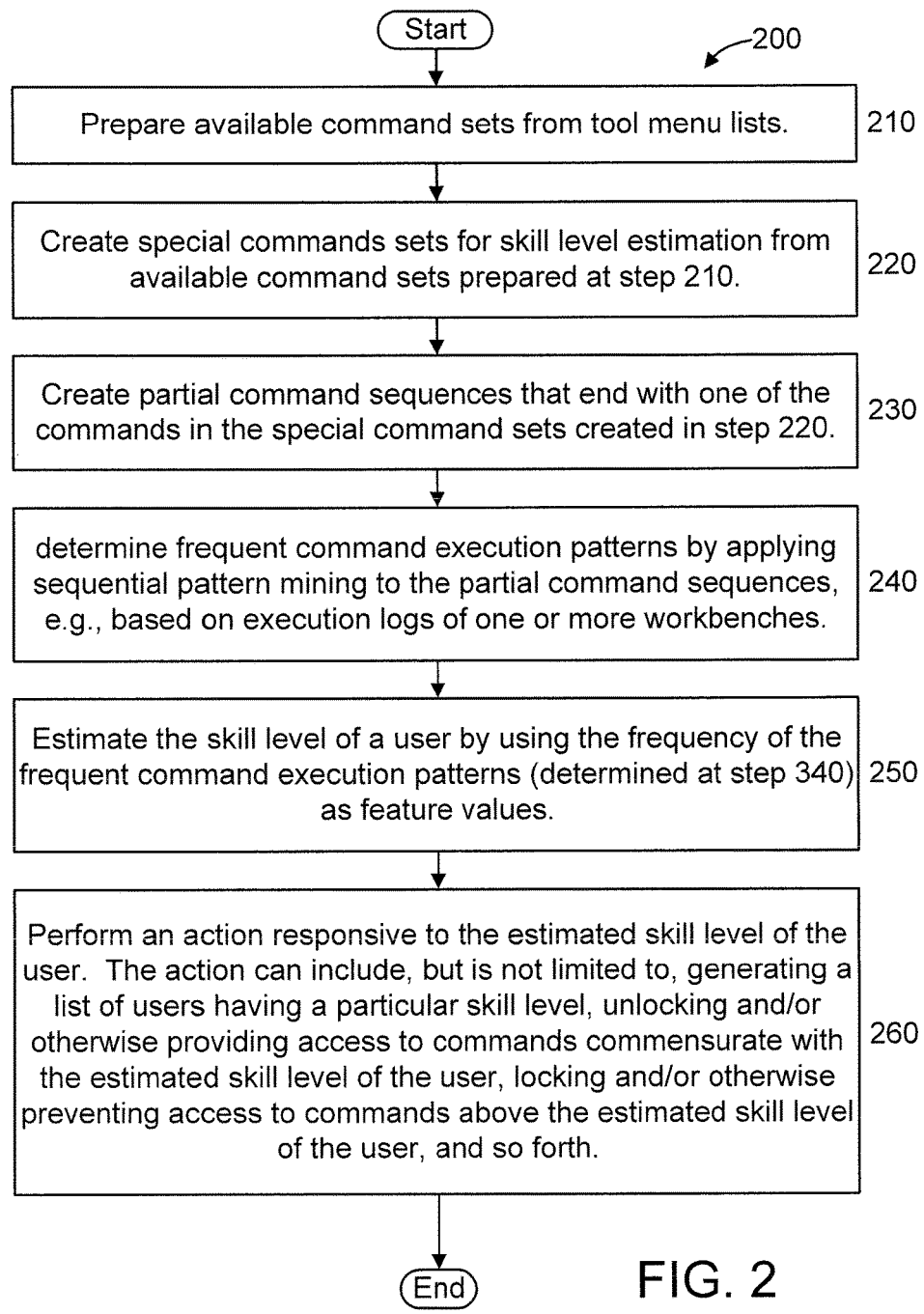
FIG. 2 shows an exemplary method 200 for extracting skill-level-based command execution patterns from a computer-aided three-dimensional interactive application (CATIA) command log, in accordance with an embodiment of the present principles.

It is to be appreciated that processing system 100 may perform at least part of the method described herein including, for example, at least part of method 200 of FIG. 2.

FIG. 2 shows an exemplary method 200 for extracting skill-level-based command execution patterns from a computer-aided three-dimensional interactive application (CATIA) command log, in accordance with an embodiment of the present principles. In an embodiment, the present principles are premised on the following: command execution sequences that end with a "special command" are regarded as a feature(s) of the user's skill level. As used herein, the term "workbench" refers to a grouping of commands related to a particular purpose, and can include tool menus under which such commands are included/listed.

At step 210, prepare available command sets from tool menu lists. In an embodiment, available commands sets are prepared per workbench (WB), since different workbenches have different sets of commands.

It is to be appreciated that there are common menu items among all workbenches such as, for example, Select, Standard, View, Graphic Properties, and so forth. Exemplary Sketcher workbench menu items include, but are not limited to: Profile; Constraint; Operation; Tools; and so forth. Exemplary Part Design workbench menu items include, but are not limited to: Sketcher; Sketch-Based Features; Boolean Operations; Tools; and so forth.

At step 220, create special commands sets for skill level estimation from available command sets prepared at step 210.

In an embodiment, the special commands set includes menu items that exist in a targeted workbench only. In an embodiment, if other workbenches have the same menu item as the targeted workbench, commands of this menu item can be excluded. In an embodiment, the Copy, Paste, and Paste Special commands are included in the special commands set, even though they may be common commands between multiple workbenches. In an embodiment, common commands between two different menu items are excluded from the special commands set even if the names of these menu items are different. In an embodiment, commands are included only when such commands are executed over a certain percentage of execution times. For example, commands can be included when such commands are executed over 95 percent of all numbers of command executions. Of course, that the preceding percentage is exemplary and, thus, other percentages can be used, while maintaining the spirit of the present principles. Moreover, it is to be appreciated that the preceding criteria for determining special commands is illustrative and, thus, other criteria can also be used in accordance with the teachings of the present principles, while maintaining the spirit of the present principles.

At step 230, create partial command sequences that end with one of the commands in the special command sets created in step 220.

At step 240, determine frequent command execution patterns by applying sequential pattern mining to the partial command sequences. In an embodiment, the frequent command execution patterns are determined (extracted) based on execution logs of one or more CATIA workbenches (e.g., but not limited to, Part Design). In an embodiment, the frequent command execution patterns are determined (extracted) based on the command execution logs of each workbench from which commands sets have been prepared as per step 210.

At step 250, estimate the skill level of a user by using the frequency of the frequent command execution patterns (determined at step 340) as feature values. In an embodiment, step 250 can involve estimating the skill level of a user by machine learning using the frequent command execution patterns as feature values. In an embodiment, one or more prediction (estimation) models are built using the frequent command execution patterns as feature values.

At step 260, perform an action responsive to the estimated skill level of the user. The action can include, but is not limited to, generating a list of users having a particular skill level (e.g., advanced, average, etc.), unlocking and/or otherwise providing access to commands commensurate with the estimated skill level of the user, locking and/or otherwise preventing access to commands above the estimated skill level of the user, and so forth. The list can be used for task assignments by an employer, and so forth. It is to be appreciated that the preceding list of actions is merely illustrative and, thus other, actions can also be performed while maintaining the spirit of the present principles.

It is to be appreciated that the present principles can advantageously provide an estimate of the skill level of a user in a reasonable processing time.

An example will now be described of applying the present principles to the Part Design workbench, in accordance with an embodiment of the present principles.

In the CATIA workbenches, each menu item can include multiple commands. Moreover, each menu item can include sub-menu items that, in turn, include multiple commands.

Regarding step 210 of method 200, available command sets (that is, groups of commands) can be prepared from the Part Design workbench for menu items including, but not limited to, the following: Sketcher; Sketch-Based Features (Compact); Advanced Draft; Boolean Operations; Annotations; Dress-Up Features; Insert; Surface-Based Features; Reference Element (Compact); MDA-Part Design; Transformation Features; Product Knowledge Template; Constraint; Tools; Analysis; and Selection Sets.

Regarding step 220, special commands sets can include, but are not limited to, the following menu items: Sketcher; Sketch-Based Features (Compact); Advanced Draft; Boolean Operations; Annotations; Dress-Up Features; Insert; Surface-Based Features; Reference Element (Compact); MDA-Part Design; Transformation Features; and Product Knowledge Template. We note that the following menu items are excluded, since other workbenches have the same menu items: Constraint; Tools; Analysis; and Selection Sets.

Further regarding step 220 and the preceding special commands sets, the following commands can be included in the special command sets due to, for example, the reasons specified above with respect to step 220: Edge Filet; Copy; Paste Special; Thickness; Body; Add; Pad; Split; Remove Face; Paste.

TABLE 1 shows an example of special commands of the Part-Design workbench in a certain upper percent of all executed commands, to which the present principles can be applied, in accordance with an embodiment of the present principles.

TABLE 1

| Special Commands |
|---|
| Edge Filet |
| Copy |
| Paste Special |
| Thickness |
| Body |
| Add |
| Pad |
| Split |
| Remove Face |
| Shell |
| Paste |

The processing time for extracting the frequent execution patterns will likely be measured in tens of seconds up to several minutes depending on the hardware used for the extraction. In an embodiment, PrefixSpan was used to extract the frequent execution patterns. Of course, other algorithms and approaches can also be used to determine/extract the frequent execution patterns, while maintaining the spirit of the present principles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for estimating a skill level of a user regarding a software program executed by the user on a computer processing system, the software program having a plurality of workbenches that each include a grouping of commands related to a particular purpose corresponding thereto that are preset by the software program, the method comprising:
creating at least one special command set for user skill level estimation by including the commands that exist in various ones of the plurality of workbenches and that are executed at least a predetermined percentage of times by the user and excluding the commands which are common to at least two of the plurality of workbenches;
creating partial command sequences from the commands in the at least one special command set;
determining frequent command execution patterns by applying pattern mining to the partial command sequences; and
estimating the skill level of the user based on frequencies of the frequent command execution patterns.

2. The method of claim 1, further comprising determining the commands that are executed at least the predetermined percentage of times by the user based on command execution logs for the commands executed by the user.

3. The method of claim 1, wherein each of the partial command sequences end with one of the commands from the at least one special command set.

4. The method of claim 1, wherein the pattern mining is sequential pattern mining.

5. The method of claim 1, wherein a respective special command set is created for each one of the plurality of workbenches.

6. The method of claim 1, wherein the commands which are common to the at least two of the plurality of workbenches are excluded from any of the at least one special command set even when the commands have different names by performing exclusion based on functionality without name consideration.

7. The method of claim 1, further comprising determining the frequent command execution patterns based on command execution logs for at least one of the plurality of workbenches.

8. The method of claim 1, wherein the skill level of the user is estimated by using the frequencies of the frequent command execution patterns as feature values.

9. The method of claim 8, wherein the feature values are used in a machine learning process that estimates the skill level of the user.

10. The method of claim 1, further comprising generating a list of users having a various skill levels, the list identifying the user and the skill level of the user.

11. The method of claim 1, further comprising at least one of locking and otherwise providing access to the commands commensurate with the skill level of the user.

12. The method of claim 1, further comprising at least one of preventing access to the commands above the skill level of the user.

13. A computer program product for estimating a skill level of a user regarding a software program executed by the user on a computer processing system, the software program having a plurality of workbenches that each include a grouping of commands related to a particular purpose corresponding thereto that are preset by the software program, the computer program product comprising a non-transitory computer readable storage medium having program instructions embodied therewith, the program instructions executable by a computer to cause the computer to perform a method comprising:
  creating at least one special command set for user skill level estimation by including the commands that exist in various ones of the plurality of workbenches and that are executed at least a predetermined percentage of times by the user and excluding the commands which are common to at least two of the plurality of workbenches;
  creating partial command sequences from the commands in the at least one special command set;
  determining frequent command execution patterns by applying pattern mining to the partial command sequences; and
  estimating the skill level of the user based on frequencies of the frequent command execution patterns.

14. The method of claim 13, further comprising determining the commands that are executed at least the predetermined percentage of times by the user based on command execution logs for the commands executed by the user.

15. The method of claim 13, wherein each of the partial command sequences end with one of the commands from the at least one special command set.

16. The method of claim 13, wherein the commands which are common to the at least two of the plurality of workbenches are excluded from any of the at least one special command set even when the commands have different names by performing exclusion based on functionality without name consideration.

17. The method of claim 13, further comprising determining the frequent command execution patterns based on command execution logs for at least one of the plurality of workbenches.

18. The method of claim 13, wherein the skill level of the user is estimated by using the frequencies of the frequent command execution patterns as feature values.

19. The method of claim 18, wherein the feature values are used in a machine learning process that estimates the skill level of the user.

20. A computer processing system for estimating a skill level of a user regarding a software program executed by the user on the computer processing system, the software program having a plurality of workbenches that each include a grouping of commands related to a particular purpose corresponding thereto that are preset by the software program, the system comprising:
  a hardware processor and a memory device, configured to:
  create at least one special command set for user skill level estimation by including the commands that exist in various ones of the plurality of workbenches and that are executed at least a predetermined percentage of times by the user and excluding the commands which are common to at least two of the plurality of workbenches;
  create partial command sequences from the commands in the at least one special command set;
  determine frequent command execution patterns by applying pattern mining to the partial command sequences; and
  estimate the skill level of the user based on frequencies of the frequent command execution patterns.

* * * * *